United States Patent
Huang et al.

(10) Patent No.: US 11,756,423 B2
(45) Date of Patent: Sep. 12, 2023

(54) AUTOMATIC VEHICLE POSITIONING MANAGEMENT SYSTEM AND METHOD THEREOF

(71) Applicant: SINBON ELECTRONICS COMPANY LTD., New Taipei (TW)

(72) Inventors: Hsiu-Ling Huang, New Taipei (TW); Wei-Chih Wu, New Taipei (TW); Ming-Chieh Lin, New Taipei (TW)

(73) Assignee: SINBON Electronics Company Ltd., New Taipei (TW)

( * ) Notice: Subject to any disclaimer, the term of this patent is extended or adjusted under 35 U.S.C. 154(b) by 273 days.

(21) Appl. No.: 17/369,060

(22) Filed: Jul. 7, 2021

(65) Prior Publication Data

US 2023/0008519 A1 Jan. 12, 2023

(51) Int. Cl.
*G08G 1/123* (2006.01)
*G01S 19/41* (2010.01)
*H04W 4/029* (2018.01)

(52) U.S. Cl.
CPC .............. *G08G 1/123* (2013.01); *G01S 19/41* (2013.01); *H04W 4/029* (2018.02)

(58) Field of Classification Search
CPC ......... H04W 4/80; H04W 4/029; H04W 4/02; G01S 19/14; G01S 17/89; G01S 19/42; G01S 19/41; G01S 15/89; G01S 19/396; G01S 19/40; G08G 1/123
See application file for complete search history.

(56) References Cited

U.S. PATENT DOCUMENTS

| | | | | |
|---|---|---|---|---|
| 6,377,210 B1* | 4/2002 | Moore | ..................... | G08G 1/20 |
| | | | | 701/532 |
| 9,194,955 B1 | 11/2015 | Fahrner et al. | | |
| 2006/0194589 A1* | 8/2006 | Sankisa | ................. | H04W 76/14 |
| | | | | 455/456.1 |
| 2012/0226390 A1* | 9/2012 | Adams | ................... | G07C 5/008 |
| | | | | 701/1 |
| 2012/0307065 A1* | 12/2012 | Mimeault | ................ | G08G 1/04 |
| | | | | 348/149 |
| 2014/0098249 A1* | 4/2014 | Park | .................... | H04N 1/00251 |
| | | | | 348/207.2 |
| 2015/0193994 A1* | 7/2015 | McQuade | .............. | G07C 5/008 |
| | | | | 701/29.3 |
| 2017/0215037 A1 | 7/2017 | Vamaraju et al. | | |

(Continued)

FOREIGN PATENT DOCUMENTS

| | | |
|---|---|---|
| CN | 110440801 A | 11/2019 |
| TW | 200835238 A | 8/2008 |

(Continued)

*Primary Examiner* — Dung Hong
(74) *Attorney, Agent, or Firm* — Rosenberg, Klein & Lee

(57) ABSTRACT

An automatic vehicle positioning management system includes an on-vehicle apparatus and a portable device. The on-vehicle apparatus, installed on a vehicle, acquires a first location of the vehicle through wireless positioning. The first location is sent to the portable device which acquires a second location of the vehicle through GPS. When multiple vehicles form a fleet, each vehicle respectively sends its first and second locations to a server through its portable device. The second location of each vehicle is corrected by operations of point error analysis, image overlay and point error correction, so that the fleet can be managed more precisely.

5 Claims, 11 Drawing Sheets

(56) References Cited

U.S. PATENT DOCUMENTS

2021/0302592 A1* 9/2021 Cambridge ........... H04W 48/16
2022/0068140 A1* 3/2022 Brandon ............ G01C 21/3492

FOREIGN PATENT DOCUMENTS

| TW | I357493 B | 2/2012 | | |
|---|---|---|---|---|
| TW | I471583 B | 2/2015 | | |
| TW | I471593 B | 2/2015 | | |
| TW | M560062 U | 5/2018 | | |
| TW | 202014729 A | 4/2020 | | |
| TW | I699545 B | 7/2020 | | |
| TW | 202104929 A | 2/2021 | | |
| TW | M617479 U | 9/2021 | | |
| WO | 2021048513 A1 | 3/2021 | | |
| WO | WO-2021048513 A1 * | 3/2021 | ............. | G01S 19/19 |
| WO | WO-2021194254 A1 * | 9/2021 | ............. | B60K 35/00 |

* cited by examiner

AUTOMATIC VEHICLE POSITIONING MANAGEMENT SYSTEM AND METHOD THEREOF

BACKGROUND OF THE INVENTION

1. Field of the Invention

The present invention is related to an automatic vehicle positioning management system and method thereof, and especially to technologies that effectively resolve issues of GPS positioning errors and provide accurate positioning data for better vehicle fleet management.

2. Description of the Related Art

Taiwan patent Publication No. 200835238 "A Real-Time Message Switching System for a Mobile Task Team" discloses a team management system and corresponding information sharing mechanism for a mobile task team, such that the members of the team can exchange information and communicate mutually in real time when they are on duty. Said system includes a real-time message switching server (RMSS), a mobile command station (MCS) and a mobile member station (MMS). The RMSS is constantly ready to connect to the MCS and the MMS for exchanging information upon which automatic or artificial decisions can be rendered. By utilizing the GPS receiver in the MMS installed on each vehicle, the position of each team member can be calculated to determine whether they are properly within the boundaries of their task ranges, and when any team member wanders beyond his/her task range, alarming signals and notifications will be sent out.

In addition, another prior art, Taiwan patent No. M560062 "Intelligent Bicycle System, Sensors Used Therein, Controllers and Controlled Devices" discloses sensors configured at a bicycle's pedals, wheel frames and inner sides of tires, so as to sense the operation status and surroundings of the bicycle and to generate corresponding sensing signals. The sensors will wirelessly connect and communicate with a controller and send said sensing signals to the controller. After processing the received sensing signals, the controller will generate a riding information and then display it to the user, and the controller also generates a control signal and sends it to a controlled device configured either at the front end or the tail of the bicycle. The controlled device wirelessly connects and communicates with the controller, and it also performs actions according to the received control signal.

The intelligent bicycle system further includes a cloud server which connects wirelessly with the controller to communicate with each other. The controller sends the received sensing signals to the cloud server for storage as records. When the controller of each of the fleet's bicycles connects wirelessly with the cloud server, the cloud server may assign a member of the fleet as the captain of the fleet. The captain's controller can instruct information regarding whether there is any fleet member dropping out or other situations. Therefore, the intelligent bicycle system provides internal management functionalities among members of the bicycle fleet.

According to the above-mentioned, current technologies can support information exchange functions to enable organizing a mobile task team and conducting fleet management. In addition, said intelligent bicycle system utilizes the sensors, the controller and the controlled device configured on the bicycle and connected to the cloud server, to assign a captain of the fleet and to instruct various information and situations as functions of the fleet management.

As for the fleet member drop out management, the position of each of the fleet members is crucial information. The aforesaid prior art patents all adopt GPS to do the positioning; however, it is well-known that GPS, as an extremely popular positioning technology, actually suffers from imprecision (1-20 feet). As a result of such imprecision, the located points which are actually on the roads could very often show up in nearby buildings instead. On the other hand, since GPS is based on signals from satellites, when a member of the fleet gets nearby a significantly large sized covering object, the signals from the satellites will tend to be blocked and then, the location of the member of the fleet will be null and misjudgments are likely to occur.

In sum, the fleet member drop out management that adopts GPS is well-known; however, the imprecision of the GPS that causes imprecise sensing of a member's location and misjudgments therefrom still needs to be tackled and resolved.

SUMMARY OF THE INVENTION

In view of the above-mentioned problems, the main purpose of the present invention is to provide an automatic vehicle positioning management system and method thereof, which mainly uses GPS for positioning, and further cooperates with another positioning technology to compensate and modify the GPS positioning points to provide more accurate positioning data, which is beneficial for fleet management.

The main technical means adopted to achieve the foregoing purpose is to provide an automatic vehicle positioning management system which includes an on-vehicle apparatus and a portable device; and
    the on-vehicle apparatus includes:
      a control module;
      a wireless positioning module which is used for direction angle positioning and distance positioning so as to generate wireless positioning data, and is connected with the control module to send the wireless positioning data thereto;
      a wireless communication module connected to the control module, which is used to connect to the portable device to transmit the wireless positioning data; and
    the portable device includes:
      a wireless communication interface which is used to connect to the on-vehicle apparatus to receive the wireless positioning data;
      a GPS positioning module which is used to provide GPS positioning data;
      a mobile communication interface which is used to transmit wireless positioning data and GPS positioning data.

Wherein, the wireless positioning data received by the portable device and the GPS positioning data provided by the portable device are further subjected to calculations including point error analysis, image overlay and point error correction to correct the errors of the GPS positioning data.

Moreover, the main technical means adopted to achieve the foregoing purpose is to provide an automatic vehicle positioning management method which includes the following steps:
    Perform wireless positioning among multiple members of a fleet to obtain multiple wireless positioning points respectively.

Obtain a GPS positioning point respectively for each member of the fleet via GPS.

Calculate a sum of offsets for the wireless positioning points and the GPS positioning points for each member of the fleet to obtain two or more trusted wireless positioning points and two or more corresponding trusted GPS positioning points with least position errors.

Perform image overlay on these trusted wireless positioning points and corresponding trusted GPS positioning points.

Wherein, the wireless positioning points other than the trusted wireless positioning points are used to correct the GPS positioning points other than the trusted GPS positioning points.

In the aforementioned method, the advantages of high accuracy of wireless positioning technology are integrated with GPS positioning for its navigation map information. After positioning the fleet members through the GPS positioning and the wireless positioning at the same time, the wireless positioning points with low deviation errors are used to correct the GPS positioning points, such that the large errors of the GPS positioning points are compensated, and then the corrected GPS positioning points will be able to provide more accurate positioning and navigation information to facilitate fleet management and drop out monitoring.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Regarding a preferred embodiment of the automatic vehicle positioning management system of the present invention, and for the convenience of description, the following embodiments will be for applications in bicycles and fleets thereof as examples, but it must be stated that it is illustrative only, and it is not meant to limit the fields in which the present invention can be applied, that is, in addition to bicycles, the present invention is also applicable to other vehicles with the fleet management requirements.

Figure 1:
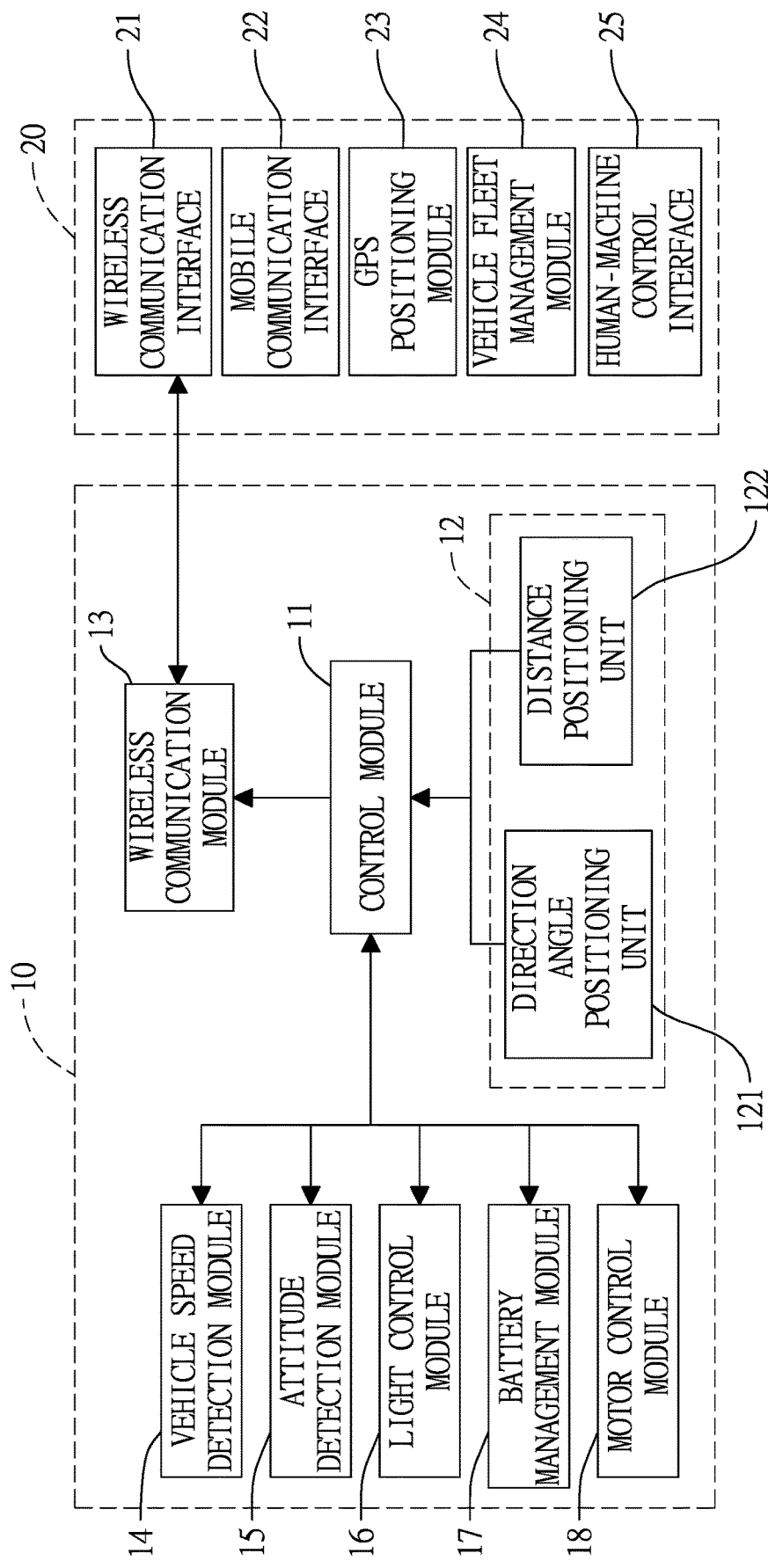
FIG. 1 is a block diagram of the automatic vehicle positioning management system of the present invention.

Please refer to FIG. 1. An on-vehicle apparatus 10 and a portable device 20 are included, wherein, the on-vehicle apparatus 10 mainly consists of a control module 11, a wireless positioning module 12 and a wireless communication module 13. The control module 11 is the computing and processing center for the on-vehicle apparatus 10, and the control module 11 is connected with the wireless positioning module 12 and the wireless communication module 13. The control module 11 receives wireless positioning data generated by the wireless positioning module 12, and transmits the wireless positioning data to the portable device 20 through the wireless communication module 13. The control module 11 connects with the wireless positioning module 12 through CANBUS/UART/RS232/RS485/I²C/SPI/GPIO or other similar communication technologies.

In the present embodiment, the wireless positioning module 12 includes a direction angle positioning unit 121 and a distance positioning unit 122. The direction angle positioning unit 121 calculates the relative direction angle of the target using the time difference between radio waves reaching different antennas based on AOA/AOD or other similar technologies. The distance positioning unit 122 calculates the distance to the target based on the signal strength of radio waves or the time difference between a round trip using RSSI/TOF or other similar technologies. From the above-mentioned, the relative direction angle and distance of more than one target can be measured by the utilizing direction angle positioning unit 121 and the distance positioning unit 122 of the wireless positioning module 12.

Since the on-vehicle apparatus 10 is for installation on a bicycle, the on-vehicle apparatus 10 may be further equipped with various sensors to sense and provide various operating-related parameters of the bicycle, which can be used for fleet monitoring and management. The aforesaid sensors may be, but are not limited to, a vehicle speed detection module 14, an attitude detection module 15 and a light control module 16. The vehicle speed detection module 14 generates a signal for calculating the vehicle speed by detecting a frequency of rotation of a wheel or its related mechanism, and the vehicle speed detection module 14 may include a Hall sensor. The attitude detection module 15 is used to detect the present attitude of the vehicle body, including acceleration, tilt angle, rotation angle, etc. The attitude detection module 15 can be composed of three-axis accelerometer, gyroscope or other similar technologies. The light control module 16 is used to control the front and rear headlights, direction lights and/or other warning lights.

When the on-vehicle apparatus 10 is used in an electric vehicle or an electric assisted bicycle, it can further include a battery management module 17 and a motor control module 18; the battery management module 17 is responsible for providing the power required for the operation of the bicycle and managing the battery charge and discharge cycle. The motor control module 18 drives the motor to provide assistive driving force for the bicycle to move forward.

The control module 11 serves as the computing and processing center of the on-vehicle apparatus 10. It will receive the data collected and/or generated from the aforementioned modules and perform preliminary edge computing, and then connect with the portable device 20 through the wireless communication module 13.

The portable device 20 includes, but is not limited to, a wireless communication interface 21, a mobile communication interface 22, a GPS positioning module 23, a vehicle fleet management module 24, and a human-machine control interface 25; wherein, the wireless communication interface 21 is connected wirelessly with the wireless communication module 13 of the vehicle apparatus 10, and a feasible way to realize such a connection is through Bluetooth®. The GPS positioning module 23 generates positioning data by receiving satellite signals; the mobile communication interface 22 is used for connecting to a cloud server and performing data exchange. The mobile communication can be 3G/4G/5G or similar mobile communication technologies.

The vehicle fleet management module 24 is used to provide users with various fleet management interface services, and the human-machine control interface 25 can be a combination of display/touch panel/voice control/external buttons. In this embodiment, the portable device 20 can be constituted by a mobile phone, the human-machine control interface 25 is a currently available human-machine interface of the mobile phone, and the vehicle fleet management module 24 can be constituted by an application program (abbreviated as App hereinafter) installed on the mobile phone.

In the present embodiment, the portable device 20 sends the received wireless positioning data and GPS positioning data generated by the GPS positioning module 23 to the cloud server through the mobile communication interface 22 to perform positioning point error correction calculations.

Figure 2:
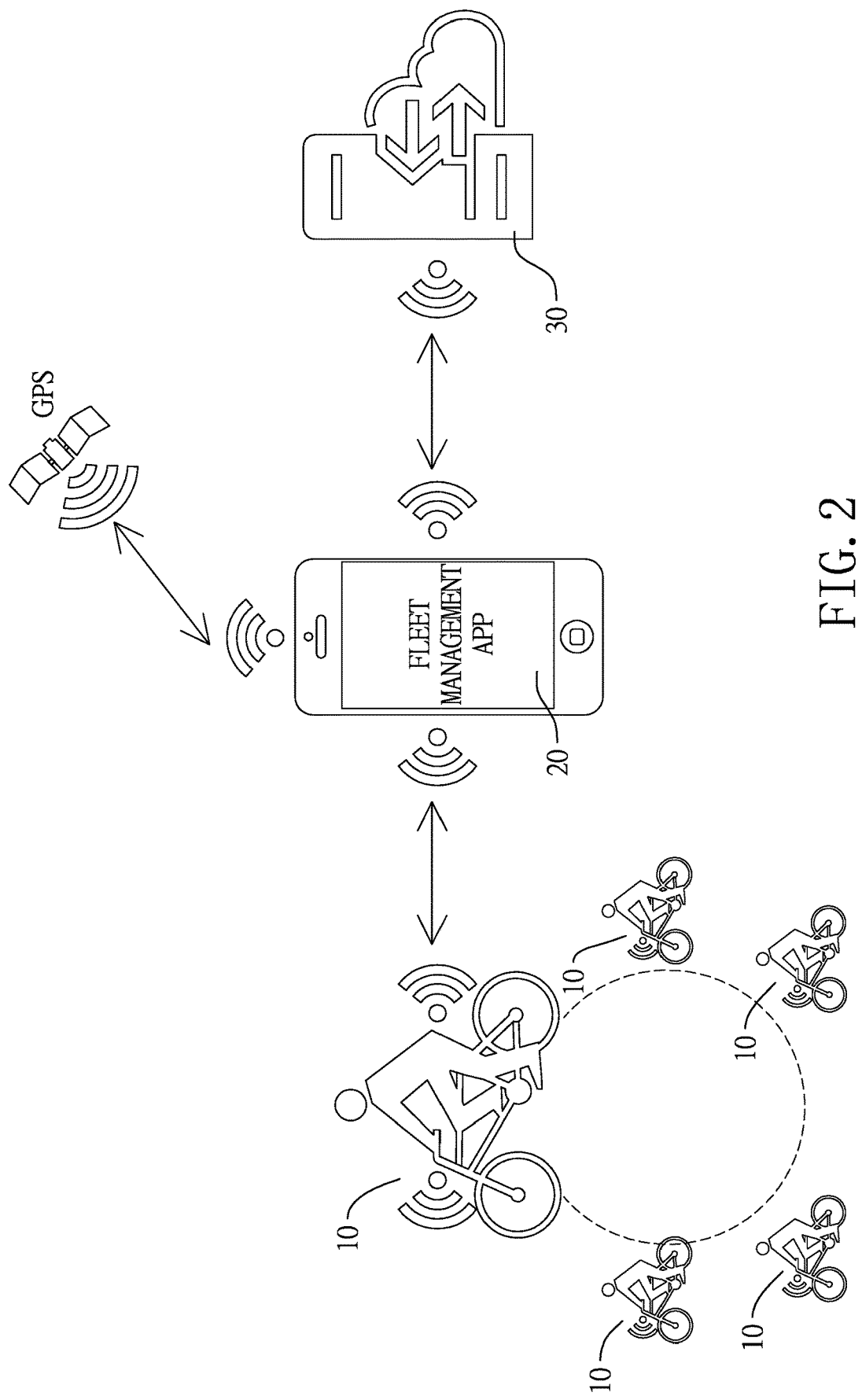
FIG. 2 is a schematic view showing application of the automatic vehicle positioning management system of the present invention.

Regarding the specific application of the vehicle automatic positioning system of the present invention, please refer to FIG. 2. Each of multiple on-vehicle apparatuses 10 is respectively installed on the bicycle of each fleet member, and the wireless positioning data of each on-vehicle apparatus 10 is sent to the portable device 20 held by each member of the fleet, and then the portable device 20 sends the received wireless positioning data and self-generated GPS positioning data to a cloud server 30. After the correction calculation is performed on the cloud server 30, the corrected positioning data is returned to the portable device 20 with the accurate location of each member of the fleet to facilitate fleet management and to effectively monitor or avoid the situation of any team member dropping out of the team.

In cooperation with the above system, an automatic positioning management method implemented of the present invention includes the following steps (please refer to FIG. 3):

Perform wireless positioning on multiple members of a fleet to obtain multiple wireless positioning points (301).

Use GPS to obtain the GPS positioning point of each member of the fleet (302).

Calculate a position offset of the wireless positioning points and the GPS positioning points for each member of the fleet to obtain two or more trusted wireless positioning points and two or more corresponding trusted GPS positioning points with least position errors (303).

Perform image overlay on these trusted wireless positioning points and the corresponding trusted GPS positioning points (304).

Use the wireless positioning points other than the trusted wireless positioning points to correct the GPS positioning points other than the trusted GPS positioning points.

The foregoing step (301) is mainly performed by the wireless positioning module 12 of the on-vehicle apparatus 10 to do positioning. Further, the members of the fleet use the wireless positioning module 12 of the on-vehicle apparatus 10 to perform direction angle positioning and distance positioning to each other.

Figure 4:
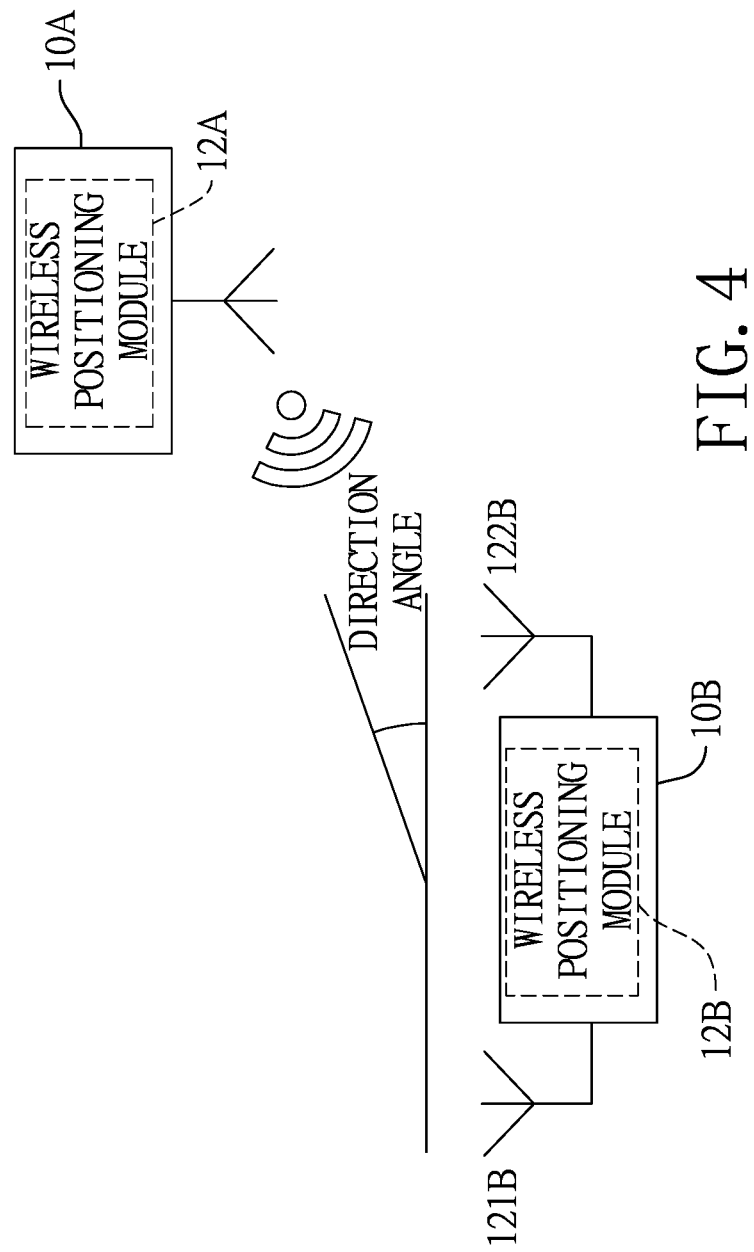
FIG. 4 is a schematic diagram of the present invention regarding the wireless positioning module performing direction angle positioning.

Please refer to FIG. 4. FIG. 4 is about the wireless positioning module 12 performing direction angle positioning. It is mainly to assign an on-vehicle apparatus 10A as a transmitter, and the wireless positioning module 12A of the on-vehicle apparatus 10A periodically sends out radio waves to allow other on-vehicle apparatus 10B (only one on-vehicle apparatus 10B is shown in FIG. 4) to perform positioning, and the wireless positioning modules 12B of other on-vehicle apparatus 10B are used as the receiving ends to receive radio waves from the transmitter. The wireless positioning module 12B has a set of antenna array. The antenna array includes at least two antennas 121B and 122B. The two antennas 121B and 122B simultaneously receive radio waves from the transmitter. Based on the time difference between the two antenna 121B and 122B receiving the radio waves, the direction angle relative to the on-vehicle apparatus 10A can be calculated.

Figure 5:
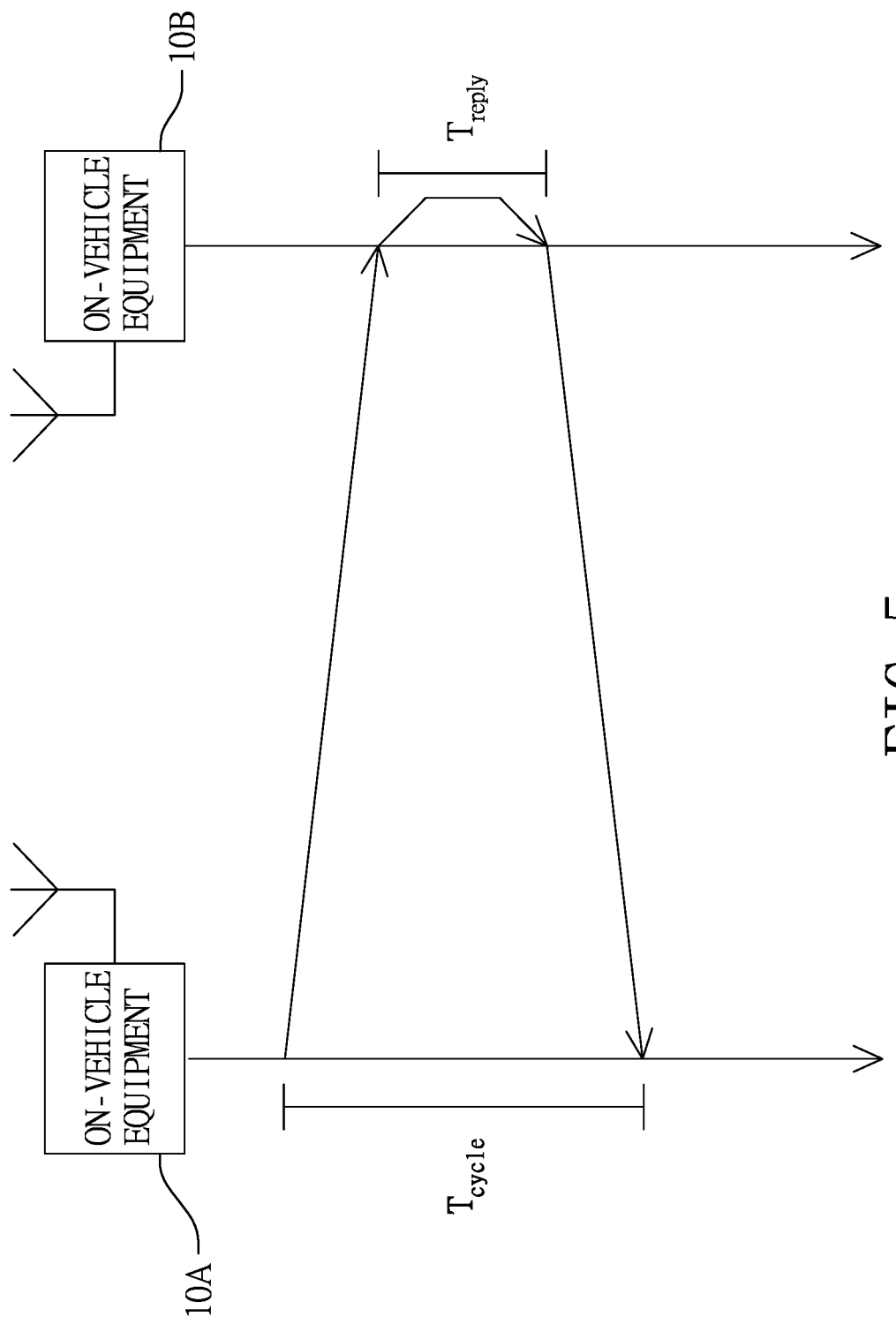
FIG. 5 is a schematic diagram of the present invention regarding the wireless positioning module performing distance positioning.

Please refer to FIG. 5. FIG. 5 further describes the techniques regarding distance positioning between on-vehicle apparatuses 10A and 10B. Mainly, an on-vehicle apparatus 10A, as an initiator, sends a positioning request signal. After receiving the positioning request and after an internal processing time interval ($T_{reply}$), another on-vehicle apparatus 10B sends back a positioning response signal to the on-vehicle apparatus 10A. After the on-vehicle apparatus 10A receives the positioning response signal, a round-trip time interval ($T_{cycle}$) of the positioning messages transmitting back and forth is calculated, and then the internal processing time ($T_{reply}$) is subtracted from the round-trip time interval ($T_{cycle}$) and then divided by 2 to obtain a one-trip time spent by the radio waves in the air (($T_{cycle} - T_{reply}$)/2), which is then further multiplied by the travel speed of the radio wave in the air to get a relative distance between on-vehicle apparatuses 10A and 10B.

Based on the above-mentioned, each on-vehicle apparatus 10 can calculate the relative direction angle and relative distance to another on-vehicle apparatus 10 by its wireless positioning module 12 using the aforementioned direction positioning and distance positioning. Although wireless positioning technology has low deviation error (less than 10 cm), it still has other limitations; for example, the effective range of wireless positioning must be within 60 meters, and not able to be directly combined with the map for lacking latitude and longitude. Hence the wireless positioning technology alone will have difficulties in positioning and tracking of the fleet members. Based on the above facts, the present invention takes advantage of the low deviation error of the wireless positioning to correct the GPS positioning data to provide high-accuracy positioning data that can be combined with map information.

Figure 6:
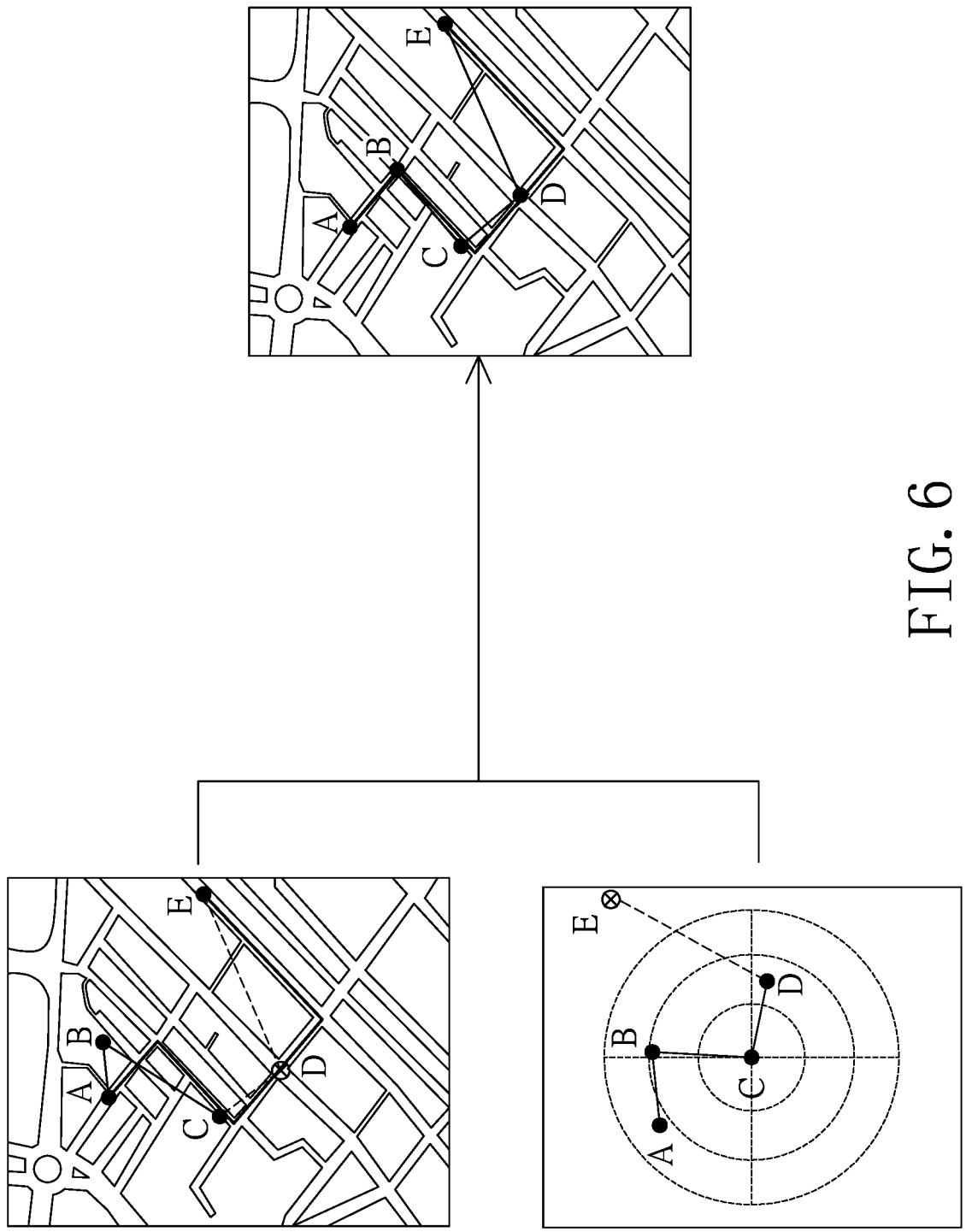
FIG. 6 is a schematic diagram of the present invention regarding integrating wireless positioning and GPS positioning.

Please refer to FIG. 6. FIG. 6 shows a schematic diagram of the present invention regarding integrating wireless positioning and GPS positioning. The upper left diagram in FIG. 6 shows the fleet positioning information generated by the GPS positioning module 23, which includes 5 members A to E. Because GPS positioning contains latitude and longitude, the fleet positioning information can be directly displayed on the navigation map; however the positioning accuracy tends to be poor, and due to obscured satellite signal obscuration, point offsets or null positioning (i.e. completely unable to locate) tend to occur.

Regarding the positioning of the five members A to E mentioned above, due to the relatively large GPS deviation error of the member B, the corresponding GPS positioning point has deviated from the road and shifted to a nearby building. The GPS location of member D is null (i.e. the location point disappears) due to factors such as obscured satellite signals.

The lower left diagram of FIG. 6 shows fleet positioning information generated through wireless positioning. As mentioned earlier, this positioning method has a low deviation error (less than 10 cm) and can accurately report the relative position of each member. However, because the position of the member E either exceeds the maximum range of wireless positioning (around 60 m), or is obscured by buildings, the wireless positioning cannot obtain the relative position of the member E.

The automatic positioning management method of the present invention can integrate GPS positioning and wireless positioning, by combining the advantages of the two and compensating for each other's shortcomings, high-precision and map-compatible positioning information can be generated. As shown in the right diagram of FIG. 6, the positioning points generated by wireless positioning will be used to modify the GPS positioning points to restore them to their actual positions, and the GPS positioning will retrieve the position of the member E who is outside the effective range of the wireless positioning. The specific detail of integrating wireless positioning and GPS positioning will be described below.

Figure 7A:
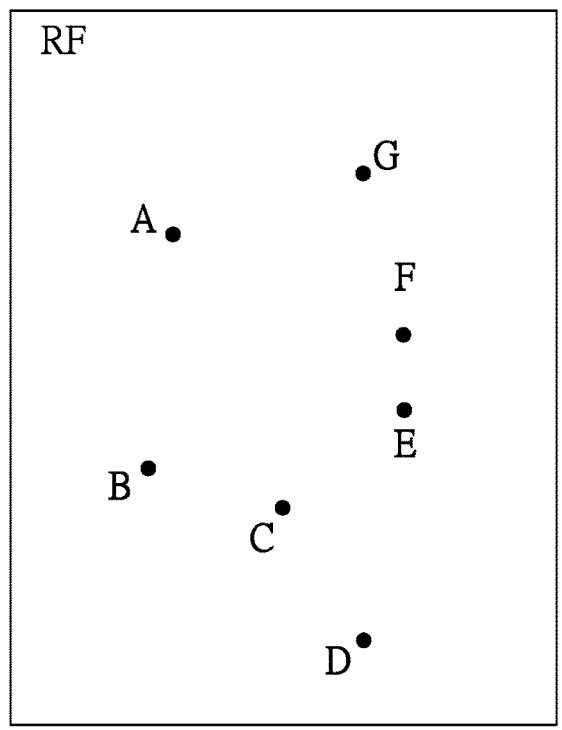
FIG. 7A is a schematic diagram of the present invention regarding using wireless positioning to generate the positioning points of each team member of the fleet.
Figure 7B:
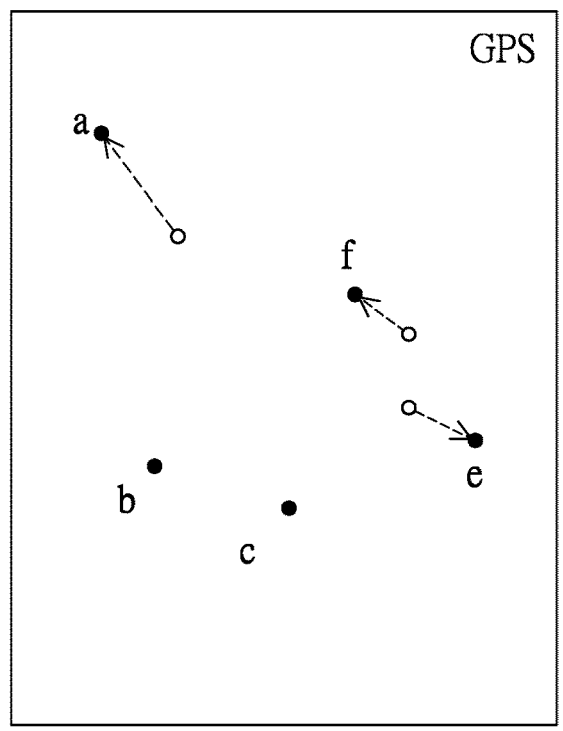
FIG. 7B is a schematic diagram of the present invention regarding using GPS positioning to generate the positioning points of each team member of the fleet.

As shown in FIG. 7A, wireless positioning is used to generate the relative positions of each member A to G of a fleet, and FIG. 7B is about the relative position of each member a to g of the same fleet using GPS positioning. By comparing FIGS. 7A and 7B, it shows that the GPS positioning has point errors regarding the relative positions of the three members a, f, and e, and because of the obscured satellite signal, the GPS positions d and g are null (i.e. not available).

Figure 3:
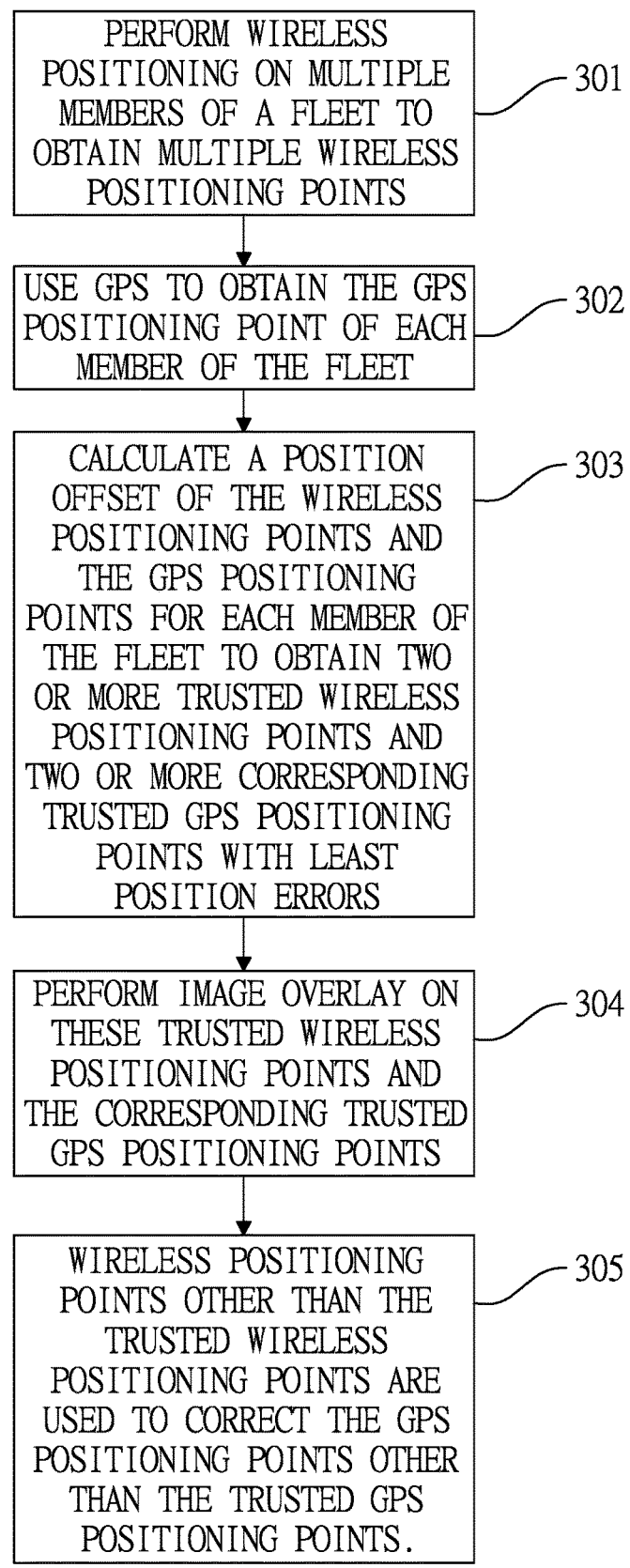
FIG. 3 is a flow chart of the automatic vehicle positioning management method of the present invention.
Figure 8A:
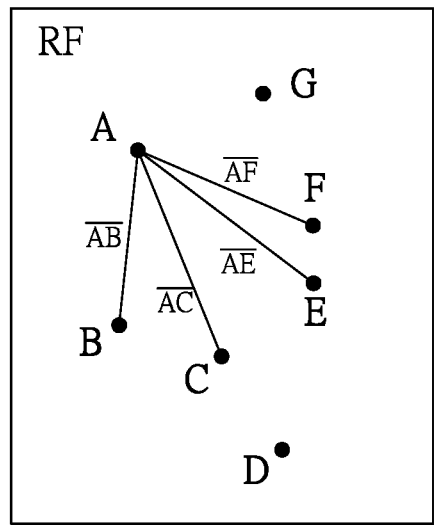
FIG. 8A is a schematic diagram of the present invention regarding calculating the relative distance of wireless positioning points.
Figure 8B:
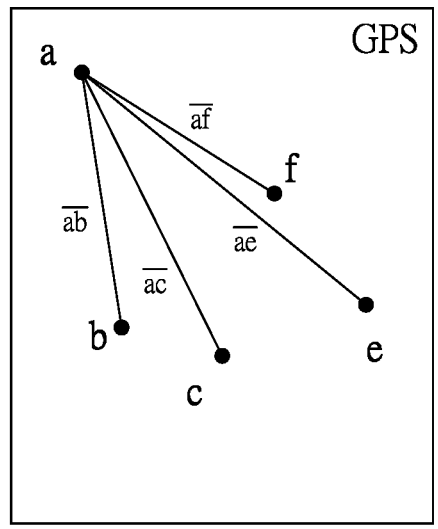
FIG. 8B is a schematic diagram of the present invention regarding calculating the relative distance of GPS positioning points.

Then proceed to the step (303) shown in FIG. 3, and calculate position offsets for members A, B, C, E, F and a, b, c, e, f whose wireless positioning and GPS positioning both exist. Please refer to FIG. 8A. Among the members who have obtained wireless positioning, the positioning point of member A is first used as a reference point to calculate the relative distances between positioning point of member A and other positioning points of members B, C, E, F, namely $\overline{AB}$, $\overline{AC}$, $\overline{AE}$, $\overline{AF}$. Please refer to FIG. 8B. Among the members who have obtained GPS positioning, the corresponding positioning point of member "a" is also used as a reference point to calculate the relative distances between positioning point of member "a" and other positioning points of members b, c, e, f, namely $\overline{ab}$, $\overline{ac}$, $\overline{ae}$ and $\overline{af}$. And a sum of the offsets $A_{offset}$ is about the sum of the absolute values of the differences between the wireless positioning distances between member A and other members B, C, E, F and corresponding GPS positioning distances between member "a" and other members b, c, e, f. The sum of the offsets $A_{offset}$ can be obtained through the following formula:

$$A_{offset} = \sum_{K=B, j=b}^{K=F, j=f} \text{abs}(\overline{AK} - \overline{aj})$$

Where abs( ) is an absolute value function and the variable K is enumerated from B to C, E to F, and the corresponding variable j is enumerated from b to c, e to f.

Figure 9:
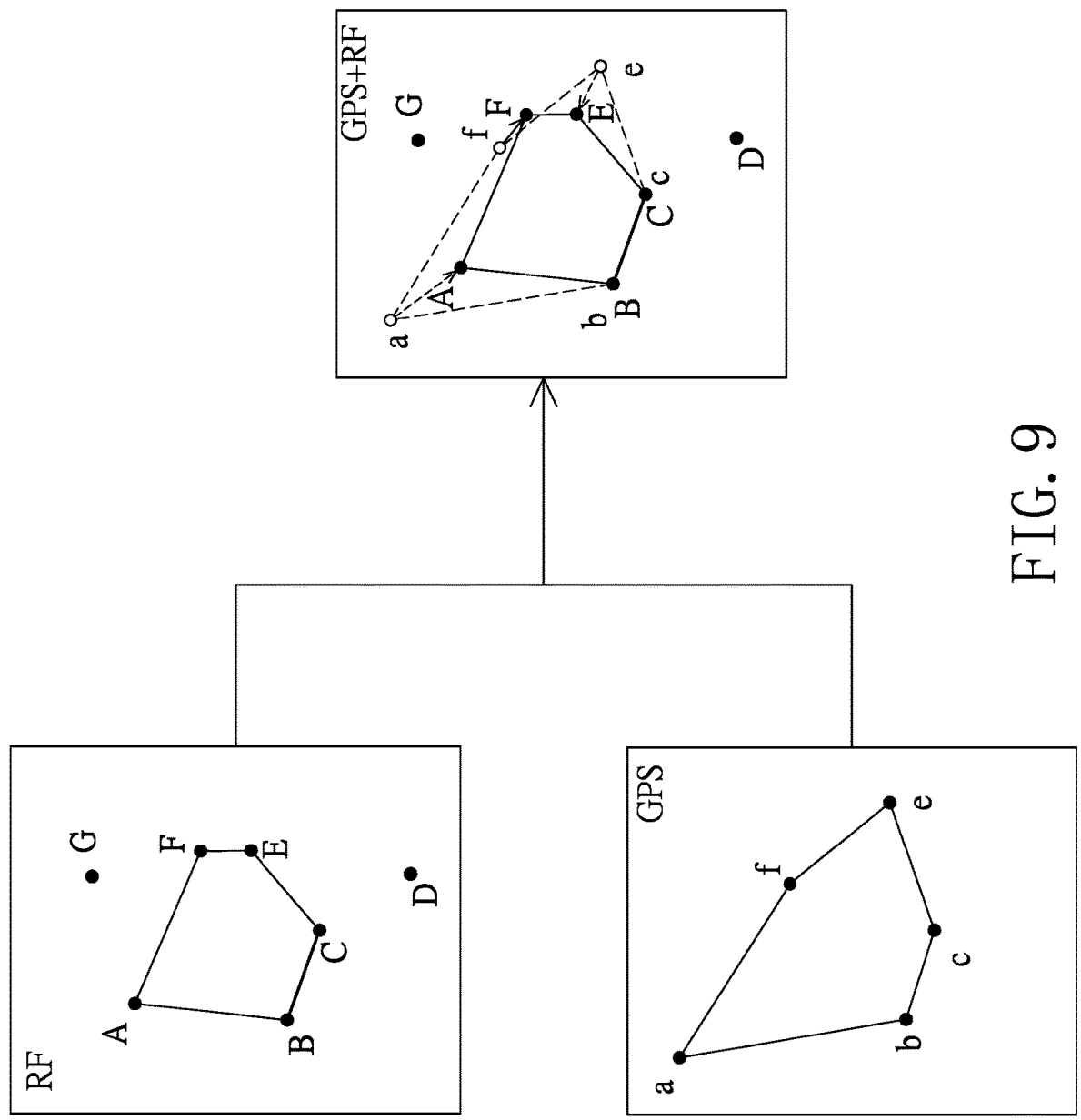
FIG. 9 is a schematic diagram of the present invention regarding offset corrections for the positioning points.

After obtaining the sum of the offsets for each of the members A, B, C, E, F (a, b, c, e, f), pick N members with the smallest sum of the offsets as reference members, where N is greater or equal to 2. In this embodiment, N is 2, that is, the two members B(b) and C(c) have the smallest sum of the offsets and are taken as the reference members accordingly. Next, perform the image overlay of the step (304) in FIG. 3, and as shown in FIG. 9, it is mainly to overlay the reference members' (B, C and b, c) wireless positioning points (the upper left diagram of FIG. 9) with the GPS positioning points (the lower left diagram of FIG. 9). And then, as the step (305) shown in FIG. 3, use the other members' (A, E, F and a, e, f) wireless positioning points to correct the corresponding GPS positioning points. And then, further supplement the null (i.e. missing) GPS positioning points of members d and g with the wireless positioning points of members D and G to complete the corrected GPS positioning data as shown in the right diagram of FIG. 9.

The wireless positioning diagram as shown in FIG. 9 can be rotated to any angle without affecting the final results of the calculation and the image overlay.

From the above, it can be seen that the automatic positioning management system and method thereof of the present invention integrates wireless positioning with small deviation errors and GPS positioning that can be loaded into a map, so as to generate a highly accurate positioning mechanism which is beneficial to fleet management. In cooperation with the on-vehicle apparatus 10, various sensing modules and the vehicle fleet management module 24 installed on the portable device 20 are able to provide a variety of real-time warning messages, including the conditions of the vehicles in front, vehicles coming from behind, team members dropping out of the team, insufficient battery power of the team members and other emergency situations that can be detected. The human-machine control interface 25 of the portable device 20 can be used in conjunction with sounds, vibrations or other messages to make it easier for the team members to detect.

Figure 10A:
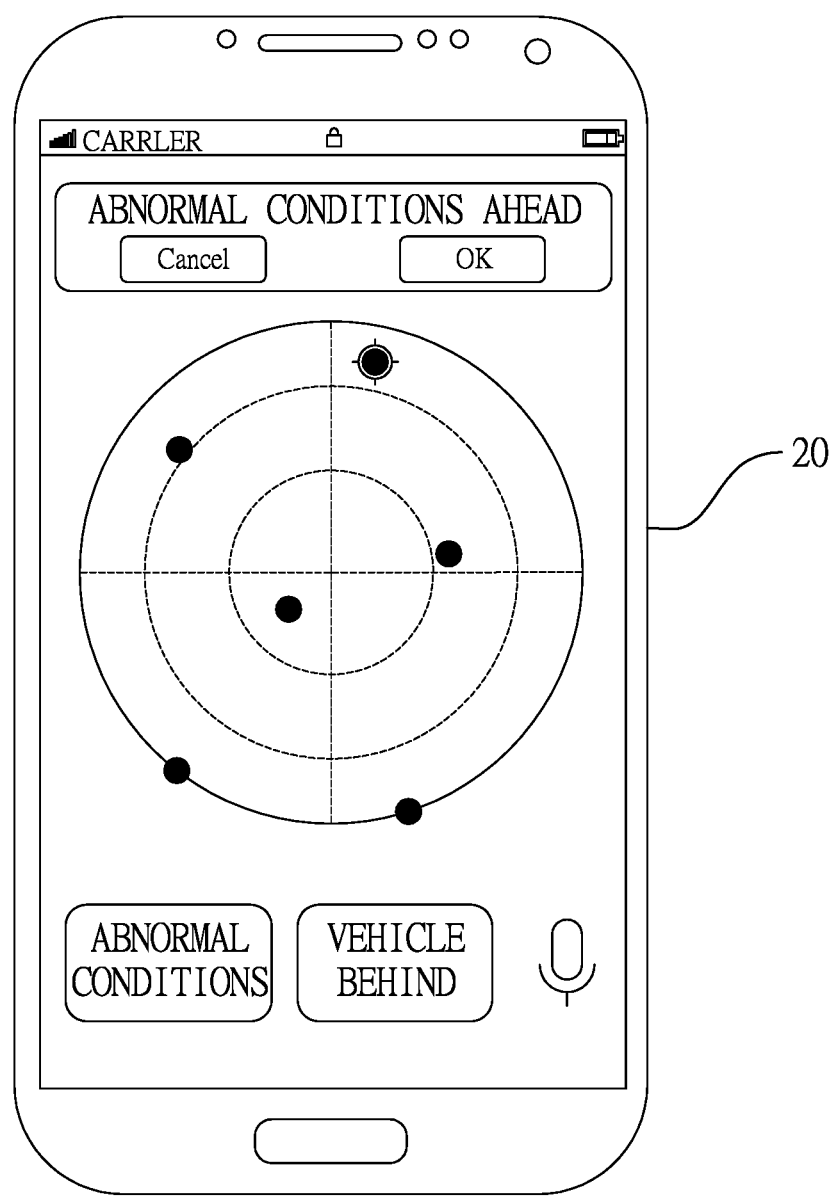
FIG. 10A is a schematic diagram of the present invention regarding the radar mode provided by the vehicle fleet management module.
Figure 10B:
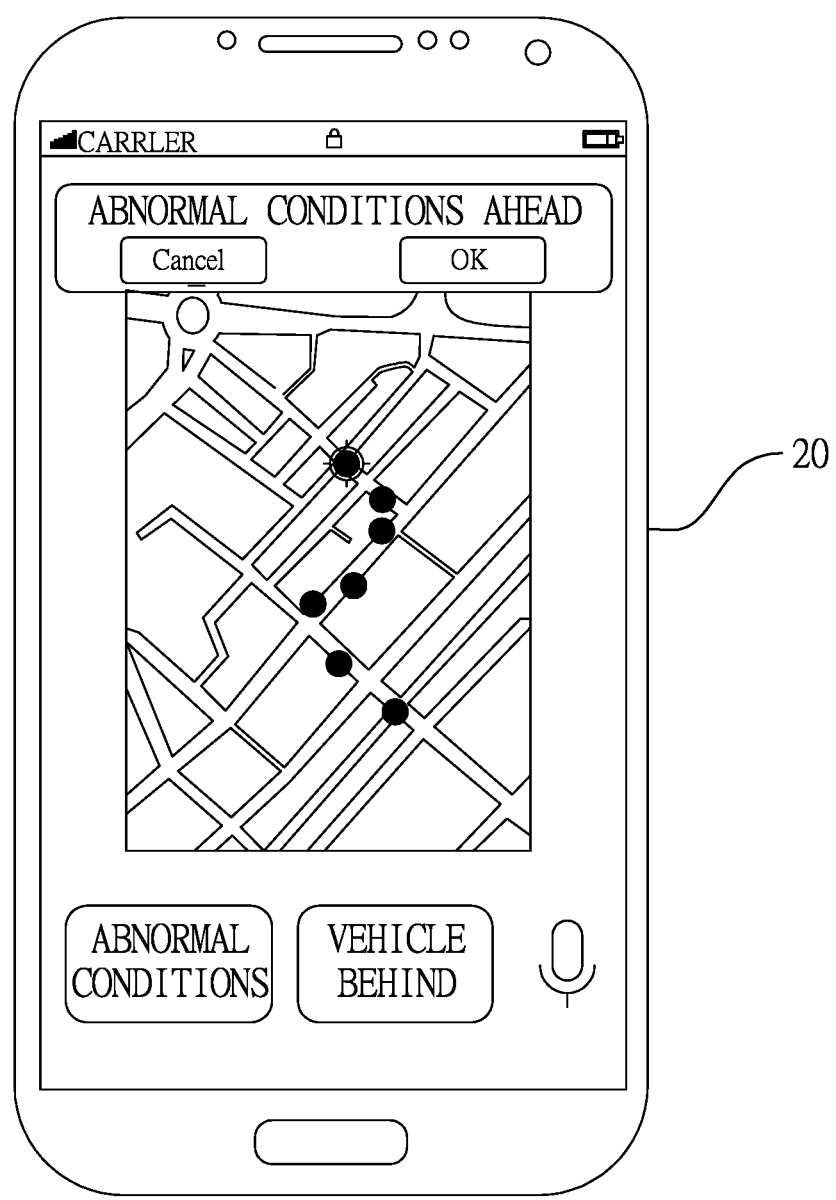
FIG. 10B is a schematic diagram of the present invention regarding the map mode provided by the vehicle fleet management module.

In terms of fleet management, the vehicle fleet management module 24 can provide a radar mode as shown in FIG. 10A to mark the real-time locations and distances of fleet members, and can also provide a map mode as shown in FIG. 10B in the form of a navigation map to mark the real-time locations of fleet members.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An automatic vehicle positioning management method, including:
   performing wireless positioning among multiple members of a fleet to obtain multiple wireless positioning points respectively;
   obtaining a GPS positioning point respectively for each member of the fleet via GPS;
   calculating a sum of offsets for the wireless positioning points and the GPS positioning points for each member of the fleet to obtain two or more trusted wireless positioning points and two or more corresponding trusted GPS positioning points with least position errors;
   performing image overlay on these trusted wireless positioning points and corresponding trusted GPS positioning points;
   wherein, the wireless positioning points other than the trusted wireless positioning points are used to correct the GPS positioning points other than the trusted GPS positioning points.

2. The automatic vehicle positioning management method as claimed in claim 1, wherein the calculation of the offsets of the wireless positioning points and the GPS positioning points is firstly to obtain two trusted wireless positioning points and two corresponding trusted GPS positioning points with least position errors, and then to perform image overlay on the two trusted wireless positioning points and the two corresponding trusted GPS positioning points.

3. The automatic vehicle positioning management method as claimed in claim 1, wherein, the wireless positioning determines the relative positions and distances between the wireless positioning points through the direction angle positioning and the distance positioning.

4. The automatic vehicle positioning management method as claimed in claim 1, wherein, corrected GPS positioning points are further supplemented with missing GPS positioning points according to the wireless positioning points.

5. The automatic vehicle positioning management method as claimed in claim 1, wherein, corrected GPS positioning points are further supplemented with wireless positioning points located outside an effective range.

* * * * *